United States Patent
Herrmann et al.

(10) Patent No.: US 8,776,354 B2
(45) Date of Patent: Jul. 15, 2014

(54) DEVICE AND METHOD FOR AUTOMATICALLY CONNECTING TWO WORKPIECES

(75) Inventors: Armin Herrmann, Riegelsberg (DE); Brian Berry, Saarbruecken (DE); Christian Brach, Wiesviller (FR); Sacha Arend, Dalem (FR)

(73) Assignee: Duerr Assembly Products GmbH, Puettlingen (DE)

( * ) Notice: Subject to any disclaimer, the term of this patent is extended or adjusted under 35 U.S.C. 154(b) by 163 days.

(21) Appl. No.: 13/263,095

(22) PCT Filed: Apr. 7, 2010

(86) PCT No.: PCT/DE2010/000395
§ 371 (c)(1),
(2), (4) Date: Nov. 17, 2011

(87) PCT Pub. No.: WO2010/115411
PCT Pub. Date: Oct. 14, 2010

(65) Prior Publication Data
US 2012/0055009 A1    Mar. 8, 2012

(30) Foreign Application Priority Data
Apr. 7, 2009  (DE) .......................... 10 2009 016 372

(51) Int. Cl.
*B23P 11/00* (2006.01)
*B23P 19/06* (2006.01)
*B23Q 7/10* (2006.01)

(52) U.S. Cl.
USPC .......................................... 29/525.11; 29/809

(58) Field of Classification Search
None
See application file for complete search history.

(56) References Cited

U.S. PATENT DOCUMENTS

| 5,222,290 A * | 6/1993 | Kvalheim | ........................ 29/787 |
| 7,422,135 B2 * | 9/2008 | Kvalheim | ..................... 227/107 |
| 2008/0061103 A1 | 3/2008 | Kvalheim | |
| 2010/0163595 A1 * | 7/2010 | Draht | ............................. 227/120 |

FOREIGN PATENT DOCUMENTS

| DE | 10 2006 036 981 | 2/2008 |
| WO | WO 2007/031701 | 3/2007 |
| WO | WO 2010/043362 | 4/2010 |

OTHER PUBLICATIONS

Machine translation of DE102006036981.*
International Search Report of PCT/DE2010/000395, Aug. 24, 2010.
English Translation of the International Preliminary Report on Patentability and Written Opinion of the International Searching Authority in PCT/DE2010/000395, Nov. 1, 2011.

* cited by examiner

*Primary Examiner* — Alexander P Taousakis
*Assistant Examiner* — Matthew P Travers
(74) *Attorney, Agent, or Firm* — Collard & Roe, P.C.

(57) ABSTRACT

A device and a method for automatically connecting two workpieces via fasteners has a magazine for receiving the fasteners. A fastener nest is provided whose lower side can be coupled to the upper side of the magazine, the fastener nest including openings for inserting the fasteners and the openings being blockable and unblockable at their lower ends.

4 Claims, 2 Drawing Sheets

DEVICE AND METHOD FOR AUTOMATICALLY CONNECTING TWO WORKPIECES

CROSS REFERENCE TO RELATED APPLICATIONS

This application is the National Stage of PCT/DE2010/000395 filed on Apr. 7, 2010, which claims priority under 35 U.S.C. §119 of German Application No. 10 2009 016 372.7 filed on Apr. 7, 2009, the disclosure of which is incorporated by reference. The international application under PCT article 21(2) was not published in English.

BACKGROUND OF THE INVENTION

1. Field of the Invention

The invention relates to a device and a method for automatically connecting two workpieces by means of fasteners, said device having a magazine for receiving the fasteners.

2. The Prior Art

Devices of this kind are used in motor-vehicle production, for example during "marriage" operations involving the bolting together of body and chassis. The invention is described below on the basis of this typical application, to which, however, it is not restricted. On the contrary, it may be used in all areas in which two workpieces are joined automatically by means of fasteners.

For bolting purposes, it is familiar practice to use extension spindles in a bolting station. The bolts are inserted into the extension spindles in advance by workers while setting up the equipment. This procedure, however, necessitates providing pallets with an extension spindle for every bolting point, incurring high pallet costs. The total number of extension spindles increases with the number of pallets in the marriage system, in turn pushing up the cost of the overall system. With mixed-type operations involving the use of different bolts, the complexity of the pallets increases. This increase in pallet complexity may, in turn, necessitate use of a pallet-switching system with conveying and pallet storage means. An additional vehicle type also necessitates new pallets, which incurs costs and is time-consuming.

According to alternative prior art, workers setting up the equipment screw the bolts into a stationary "pallet nest" provided with threaded holes. In the bolting station, a robotic tool unscrews the bolts one after the other and inserts them into the body. Here too, workers setting up the equipment have to screw the bolts into the pallet nest, a repetitive task which is also relatively time-consuming. Moreover, the robotic tool then has to unscrew the bolts again from the pallet nest, requiring a certain degree of cycle time.

SUMMARY OF THE INVENTION

The object of this invention is to improve a device and a method for automatically connecting two workpieces to the effect that supplying the fasteners is less personnel- and cost-intensive.

This object is established according to the invention for a device according to the preamble by provision of a fastener nest whose lower side can be coupled with the upper side of the magazine, the fastener nest comprising openings for inserting the fasteners and said openings being blockable and unblockable at their lower ends.

With this device, it is merely necessary to insert the fasteners into the openings of the fastener nest and then to transfer them to the magazine by unblocking the openings. The invention offers a multiplicity of advantages over the prior art, in particular the following:

- A shorter cycle time is needed than when the fasteners are screwed into and out of the nest, since now all the fasteners can be transferred in one operation,
- The bolts are sorted at the same time as the equipment moves to the respective bolting position, again reducing cycle time,
- Pallet complexity is reduced and the extension spindles on the pallets are superfluous, enhancing flexibility and cutting costs,
- The fastener nest may be positioned on the pallet or at the bolting station, enhancing flexibility and cutting costs, and
- The device may be used to connect two workpieces positioned arbitrarily in space.

According to the invention, the fasteners may be screws, bolts, pins, nuts or rivets.

A preferred embodiment of the invention consists in that, for coupling the fastener nest to the magazine, the magazine is provided with a pin that corresponds to a central opening in the fastener nest.

An alternative method of coupling the fastener nest to the magazine may consist in providing the fastener nest with a pin that corresponds to a central opening in the magazine.

It is within the scope of the invention that means are provided for supplying the fastener nest automatically with fasteners.

The nest may be supplied not only manually but also automatically, which may enhance flexibility and reduce unit cost.

The scope of the invention also includes a method for automatically connecting two workpieces by means of fasteners, involving the following steps:

- Inserting the fasteners into a fastener nest, the fastener nest having, for insertion of the fasteners, openings that can be blocked and unblocked at their lower ends,
- Coupling the fastener nest to a magazine for receiving the fasteners,
- Unblocking the openings in the fastener nest and thereby transferring the fasteners to the magazine.

A refinement of the invention consists in the following additional step:

Clamping and positioning the fasteners in the magazine.

BRIEF DESCRIPTION OF THE DRAWINGS

An embodiment of the invention is described below by reference to drawings.

DETAILED DESCRIPTION OF THE PREFERRED EMBODIMENTS

Figure 1A:
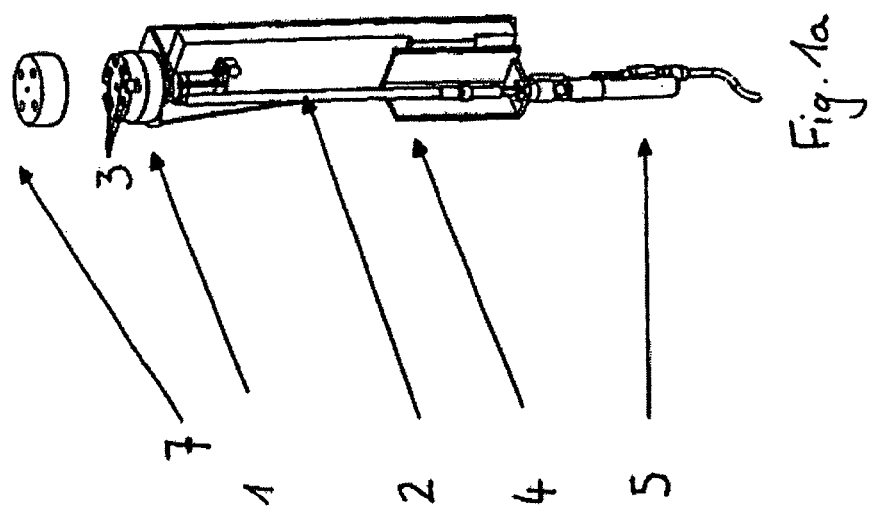
FIG. 1a and FIG. 1b show an overall and a detailed view of the device according to the invention
Figure 1B:
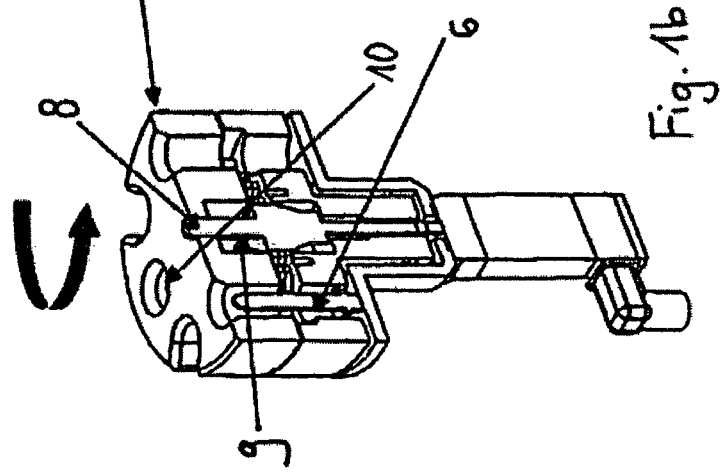

As is evident from FIG. 1a, a device according to the invention has a rotatable magazine 1 for fasteners, under which a screw spindle 2 is positioned. The latter can be aligned at any one time with an opening 3 in the magazine 1. FIG. 1a also shows a lifting unit 4 and the fastening (here bolting) tool 5. In the example shown here, the magazine 1 has four openings 3 into which fasteners 6 (here bolts) can be received, clamped and positioned.

A fastener nest 7 is also shown, which can be coupled to the magazine 1. In this example, the fastener nest 7 is coupled to the magazine 1 by means of a pin 8 in the magazine 1. The pin 8 engages a central opening 9 in the fastener nest 7. The fastener nest 7 preferably has the same number of openings 10 as the magazine 1.

Figure 2A:
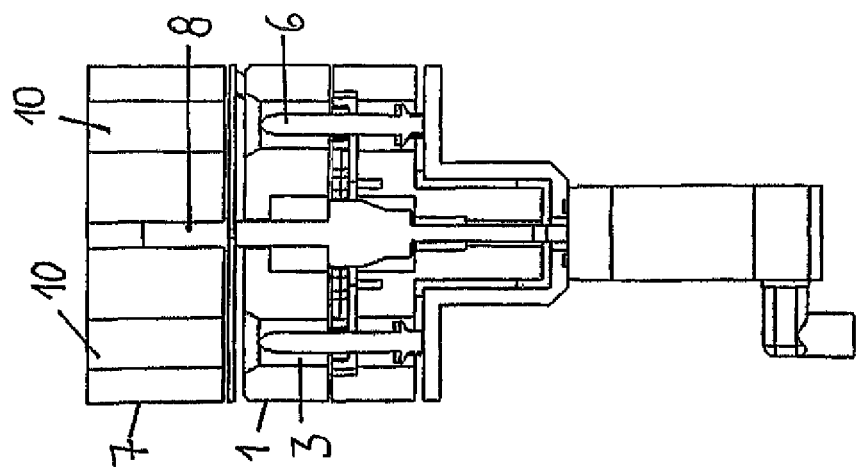
FIG. 2a, FIG. 2b and FIG. 2c show an automatic bolting process using a device according to the invention.
Figure 2B:
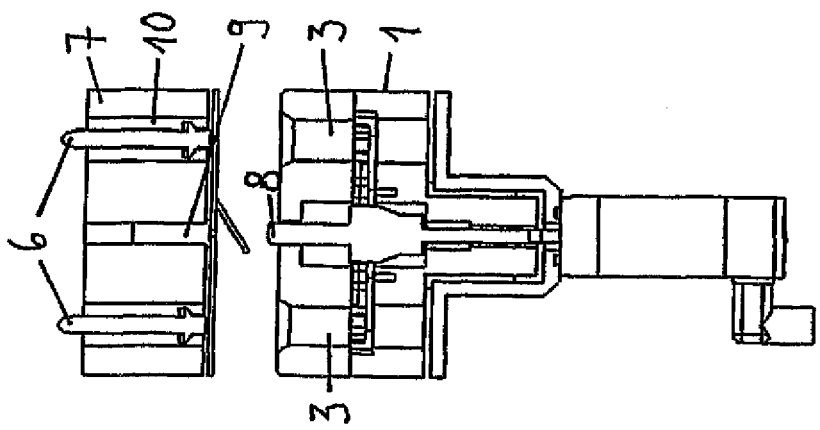
Figure 2C:
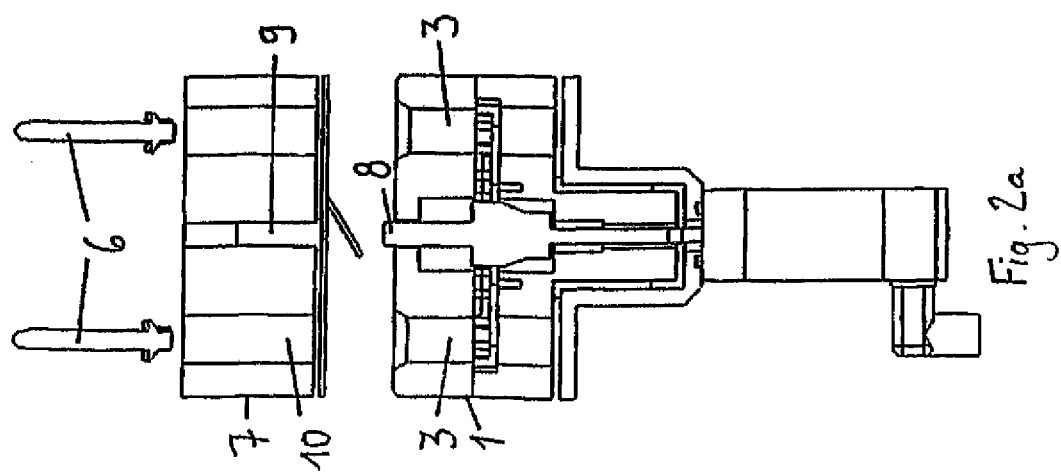

FIGS. 2a to 2c show the individual steps involved. As is evident from FIGS. 2a and 2b, the fasteners 6, in this case bolts, are inserted manually or automatically into the openings 10 of the fastener nest 7. To start with, the openings 10 in the fastener nest 7 are blocked at the bottom.

As shown in FIG. 2c, the openings in the fastener nest 7 are then unblocked at the bottom of the fastener nest 7, allowing the fasteners 6 to slide into the magazine 1, where they are clamped and positioned. As the equipment moves to the respective bolting position, the fasteners 6 are sorted and supplied to the bolting tool 5, which then executes the respective bolted connection.

The invention claimed is:

1. A method for automatically connecting two workpieces via fasteners comprising screws or bolts, the method comprising the following steps:

inserting the fasteners into a fastener nest, the fastener nest having, for insertion of the fasteners, openings that can be blocked and unblocked at their lower ends;

coupling the fastener nest directly to a rotatable magazine with the same number of openings for receiving the fasteners, under which a screw spindle of a bolting tool is positioned;

unblocking the openings in the fastener nest and thereby transferring the fasteners to the magazine;

clamping and positioning the fasteners in the magazine, sorting the fasteners as the equipment moves to the respective bolting position, and supplying the fasteners to the bolting tool which then executes the respective bolting connection.

2. The method according to claim 1, wherein, for coupling the fastener nest to the magazine, the magazine is provided with a pin that corresponds to a central opening in the fastener nest.

3. The method according to claim 1, wherein, for coupling the fastener nest to the magazine, the fastener nest is provided with a pin that corresponds to a central opening in the magazine.

4. The method according to claim 1, wherein means are provided for supplying the fastener nest automatically with fasteners.

\* \* \* \* \*